Nov. 17, 1925.
G. B. RAYMOND
EDUCTOR
Filed June 27, 1922
1,561,744
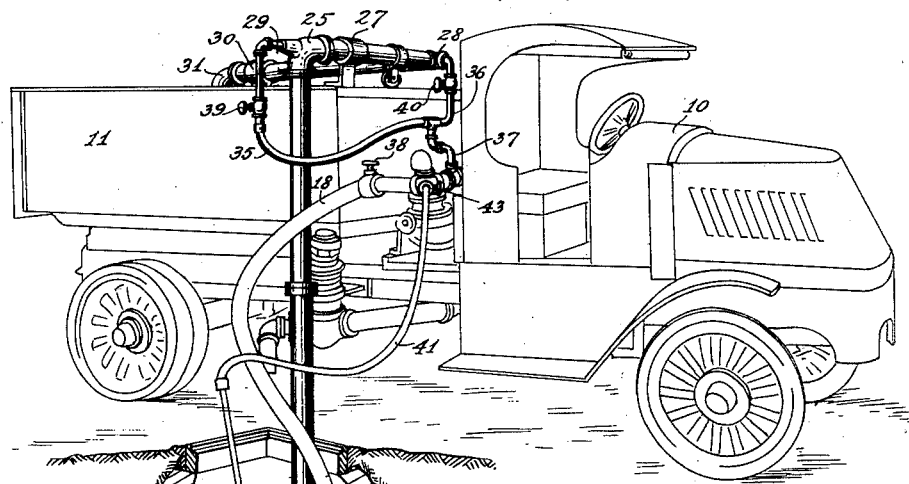
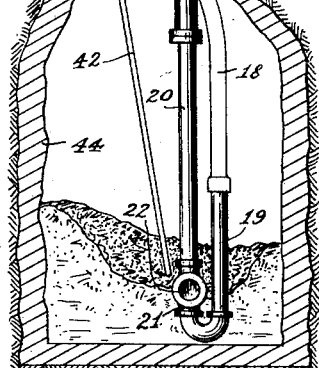
Fig. 1
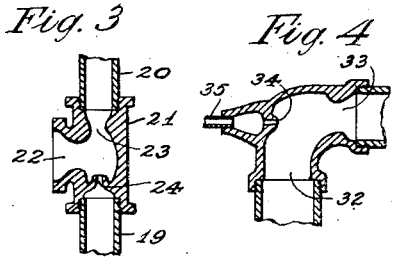
Fig. 3  Fig. 4
Fig. 2
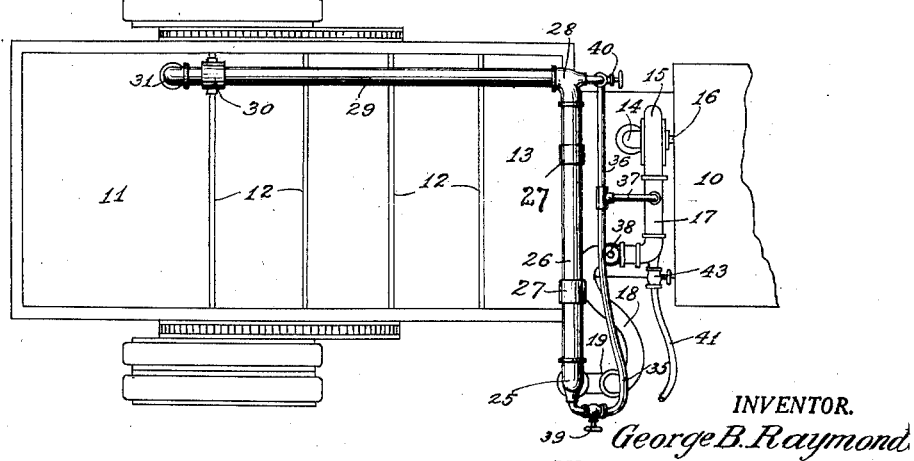
INVENTOR.
George B. Raymond
BY
Chamberlain & Newman ATTORNEYS.

Patented Nov. 17, 1925.

1,561,744

UNITED STATES PATENT OFFICE.

GEORGE B. RAYMOND, OF DANBURY, CONNECTICUT.

EDUCTOR.

Application filed June 27, 1922. Serial No. 571,269.

*To all whom it may concern:*

Be it known that GEORGE B. RAYMOND, a citizen of the United States, and resident of Danbury, in the county of Fairfield and State of Connecticut, has invented certain new and useful Improvements in Eductors, of which the following is a specification.

The present invention relates to improvements in hydraulic eductors, particularly for transferring semi-fluid material from one location to another. It may be used, for instance, in drawing the refuse from catch-basins into a tank-car, and the disclosed embodiment of the invention is described in connection with such use.

An object is to provide such an apparatus adapted to elevate and eject the material from a relatively low level to a high one, and to do this in a more positive and effective manner than has been possible with such apparatus heretofore in use. Considerable difficulty has been experienced in the past in causing such apparatus to elevate the material with a uniform flow, and to evenly sustain the moving weight of the substance, so that either the conducting tubes became clogged or the flow was more or less spasmodic. This was particularly true where the tubes had one or more bends in them.

It is proposed in the present invention to provide an apparatus in which the flow of the material will be uniform throughout the conduit, and in which a system of propelling jets—or other equivalent means—is provided at the points in the conduit where an increased propelling force is desirable; that is, at the bends in the tube or conduit.

A further object is to provide an apparatus for removing material from various depths—the same being adjustable for this purpose—and to provide hydraulic conducting means for propelling the material, which may be proportionately adjusted as to the propelling force required.

A still further object is to adapt the apparatus for installing and carrying on a motor truck, the complete apparatus being adapted not only for removing the material, but for conveying it to a suitable place of disposal.

With the above and other objects in view, an embodiment of the invention is shown in the accompanying drawings, and this embodiment will be hereinafter more fully described with reference thereto, and finally pointed out in the claim.

In the drawings:

Fig. 1 is a perspective view of a motor-truck, installed with a hydraulic eductor apparatus, according to the present invention, and showing the catch-basin in vertical section;

Fig. 2 is a plan view thereof;

Fig. 3 is a detail sectional view of the ejector at the lower end of the conduit, and Fig. 4 is a detail sectional view of one of the other ejectors, at a bend in the conduit.

Similar reference characters indicate corresponding parts in the several figures.

Referring to the drawings, the embodiment of the invention shown therein is incorporated in a motor truck, indicated generally as 10, and carrying a receiving tank 11, in the form of a settling-bed. This tank may be of any suitable type, and is preferably similar to those shown in the U. S. patents to Otterson #1,295,056, of February 18, 1919, #1,343,471 of June 15, 1920, or Cartwright #1,331,239 of February 17, 1920. It is provided with a series of perforated baffles 12, the semiliquid material being first deposited in the rear compartment, the liquid content being gradually filtered through the baffles, and the clarified liquid finally flowing through the foremost baffle into the forward compartment 13, from which it passes through a duct 14, to the pump 15, where it is returned in the circuit.

The pump is driven by the power plant of the vehicle through a drive shaft 16.

The outlet side of the pump is provided with a union 17, to which is connected a pressure line 18, extending to a return-bend U-connection 19, coupled to the lower end of the hydraulic eductor elevator conduit 20.

The ejector inlet section 21, connecting the U-section 19 to the conduit 20, Fig. 3, may be of any suitable form. It is preferably provided with a laterally extending mouth 22, a restricted throat portion 23, and a jet nozzle 24, directed toward the restricted throat, water under pressure being fed as a jet through the restricted passage of the throat. The action of the ejector, as is well understood, is to draw the material into the mouth, and to elevate it upwardly through the conduit.

The elevating conduit 20 is formed in a plurality of telescoping sections, three as shown, to permit it to be lowered to any suitable depth, the upper section, which is fixed to the vehicle, being adapted to receive the other sections in raised relation to the street level.

The upper section is connected by a right-angle ejector union 25, to one end of a horizontally disposed conduit 26, mounted in brackets 27, at the forward end of the tank, and connected at its other end by a right-angle ejector union 28, to a conduit 29, mounted in a movable bracket 30, and provided with an outlet end 31, adapted to deposit material in the rear compartment of the tank.

The ejector unions, Fig. 4, are substantially similar in type to the ejector 21, being provided with an inlet 32, a restricted throat 33, adjacent the outlet, and a jet nozzle 34, directed toward the throat.

The ejectors 25 and 28 are connected by tubes 35 and 36 to an adjustable hose 37 connected to the union 17 of the pump. Valves 38, 39 and 40 control the flow of water under pressure to the respective ejectors 21, 25 and 28.

An agitator hose 41, having an elongated nozzle 42, is connected by a valved connection 43 with the union 17, and wherewith the attendant can stir up the contents of the catch-basin 44, the nozzle being directed through the harder upper layers of the deposit, so that the contents may be partially liquefied, from below, to an extent sufficient to facilitate the action of the ejectors.

In operation, the hydraulic eductor elevator is lowered through the manhole of the basin, and its end imbedded in the deposit. The hydraulic pump is set in operation and the semi-liquid material elevated through the action of the ejectors. The provision of the several ejectors at spaced points, and particularly at the bends, results in a uniform and positive elevating or propelling action evenly distributed throughout the line. It precludes any possibility of clogging or backflow, especially at the bends, where greater friction is set up, the lower inlet ejector being supplemented in its action by the others, and relieved of considerable of the flowing weight of the material. The material is deposited in the rear compartment of the tank and its liquid content gradually filtered and returned in clarified condition in the circuit, through the propelling action of the pump.

I have illustrated and described a preferred and satisfactory embodiment of the invention, but it is obvious that changes may be made therein, within the spirit and scope thereof, as defined in the appended claim.

I claim:

In an apparatus of the character described, an elongated settling bed having a material receiving section at the rear end thereof, material conducting means having an inlet at one end and adapted to deposit at its other end into said material receiving section of the settling bed, and comprising a vertically disposed pipe section extending upwardly from said inlet, a transverse pipe section extending from the vertical section at the forward end of said settling bed, and a horizontal pipe section extending from said transverse section longitudinally of said settling bed to said depositing end, a hydraulic pump, an ejector at said inlet end, conduit means connecting said ejector to said hydraulic pump for feeding water under pressure, said ejector adapted to lift material through said vertical section, an auxiliary ejector at the junction of said vertical and transverse sections directed axially through said transverse section, a second auxiliary ejector at the junction of said transverse and horizontal sections directed axially through said horizontal section, and conduit means connecting said auxiliary ejectors to said hydraulic pump for feeding water under pressure, valve means for controlling the feed of water to said auxiliary ejectors, and said auxiliary ejectors forming parts of the fittings which connect the pipe sections at their junctures.

Signed at Danbury in the county of Fairfield and State of Connecticut this 20th day of June, A. D. 1922.

GEORGE B. RAYMOND.